United States Patent [19]
Uriu et al.

[11] Patent Number: 5,636,222
[45] Date of Patent: Jun. 3, 1997

[54] BROADCAST METHOD AND SYSTEM WITH CELL TAG INFORMATION FOR MULTIPLE SELF-ROUTING

[75] Inventors: Shiro Uriu; Shuji Yoshimura; Satoshi Kakuma, all of Kawasaki, Japan

[73] Assignee: Fujitsu Limited, Kawasaki, Japan

[21] Appl. No.: 565,316

[22] Filed: Nov. 30, 1995

Related U.S. Application Data

[63] Continuation of Ser. No. 243,444, May 16, 1994, abandoned, which is a continuation of Ser. No. 854,574, Mar. 20, 1992, abandoned.

[30] Foreign Application Priority Data

Mar. 20, 1991 [JP] Japan ..................... 3-056921

[51] Int. Cl.$^6$ ..................................... H04L 12/56
[52] U.S. Cl. ............................. 370/390; 370/395
[58] Field of Search ................. 370/54, 60, 60.1, 370/65.5, 94.1, 97, 94.2, 13.1, 16; 340/826, 827, 825.02, 825.04, 825.79, 825.89, 825.34, 825.52, 825.07, 825.18, 825.21, 825.8; 375/211, 219, 259, 260, 213, 214

[56] References Cited

FOREIGN PATENT DOCUMENTS

| | | |
|---|---|---|
| WO-A-8805982 | 8/1988 | European Pat. Off. . |
| WO-A-8909521 | 10/1989 | European Pat. Off. . |

OTHER PUBLICATIONS

Kato et al, "Experimental Broadband ATM Switching System," Proc. of Globecom '88, Nov. 88, pp. 1288–1292.
Ahmadi et al, "A Survey of Modern High–Performance Switching Techniques", Sep. 1989, IEEE Journal on Selected Areas in Comm., 1091–1103.
McDysan and Spohn, ATM Theory and Application, pp. 124–226 and 203–204 1994.
Ahmadi et al., "A Survey of Modern High–Performance Switching Techniques", Sep. 1989, IEEE Journal on Selected Areas in Comm., 1091–1103.
Y. Kato et al., "A VLSIC for the ATM Switching System", Int. Switching Symposium 90, vol. 3, pp. 27–32, May 1990, Stockholm, SE.
H. Kuwahara et al., "A Shared Buffer Memory Switch for an ATM Exchange", IEEE Int. Conf. on Communications 89, vol. 1, pp. 118–122, Jun. 1989, Boston, US.

(List continued on next page.)

*Primary Examiner*—Wellington Chin
*Assistant Examiner*—William Luther
*Attorney, Agent, or Firm*—Staas & Halsey

[57] ABSTRACT

When broadcast is executed in an ATM mode, a subscriber is assigned a path and a channel as information by a central controller of a switching unit, and the information is added to a cell to be transmitted to the switching unit through a subscriber line. The switching unit comprises the central controller, a tag information adder, and a self-routing switch. The self-routing switch comprises a plurality of input lines and output lines, and unit switches provided for each input line corresponding to each of the output lines. The tag information adder adds routing information for the self-routing switch to a cell to be transmitted to the self-routing switching. The routing information comprises a set of bits corresponding to each output line, and the tag information adder adds to the cell the routing information in which a bit corresponding to an output line for transmitting the cell is set to a predetermined logical value. In executing the broadcast, a plurality of bits corresponding to a plurality of output lines are set to a predetermined logical value. The self-routing switch analyzes the routing information of the cell received by each unit switch, and outputs the cell to the outpost line if the bit corresponding to a unit switch is set to a predetermined logical value. If a plurality of bits of routing information are set to a predetermined value, the cell is outputted from a plurality of output lines, thus enabling the broadcast.

8 Claims, 9 Drawing Sheets

OTHER PUBLICATIONS

L. Ni et al., "A VLSI Router Design for Hybercude Processors", Integration, The VLSI Journal, vol. 7, No. 2, Aug. 1989, Amsterdam, NL.

Y. Kato, et al., "A VLSIC For The ATM Switching System", Int. Switching Symposium 90, vol. 3, pp. 27–32, May 1990, Stockholm, SE.

H. Kuwahara, et al., "A Shared Buffer Memory Switch for An ATM Exchange", IEEE Int. Conf. on Communications 89, vol. 1, pp. 118–122, Jun. 1989, Boston, US.

L. Ni, et al., "A VLSI Router Design for Hybercube Processors", Integration, The VLSI Journal, vol. 7, No. 2, Aug. 1989, Amsterdam, NL.

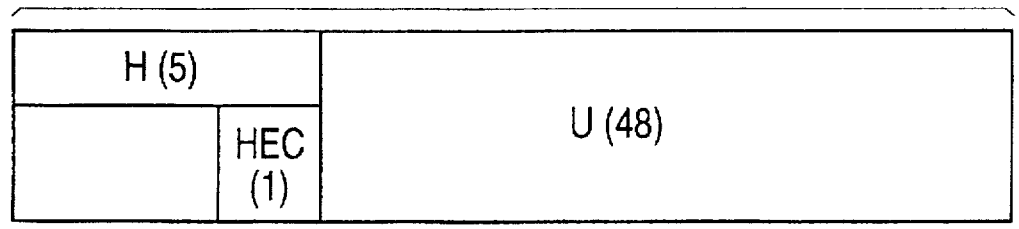
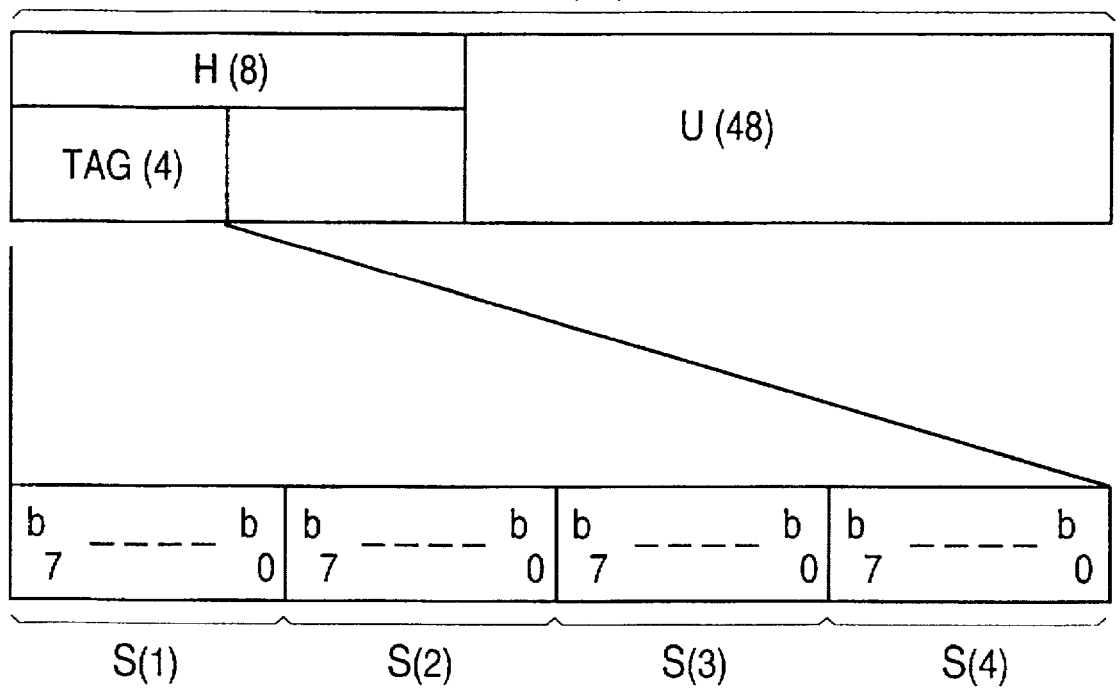

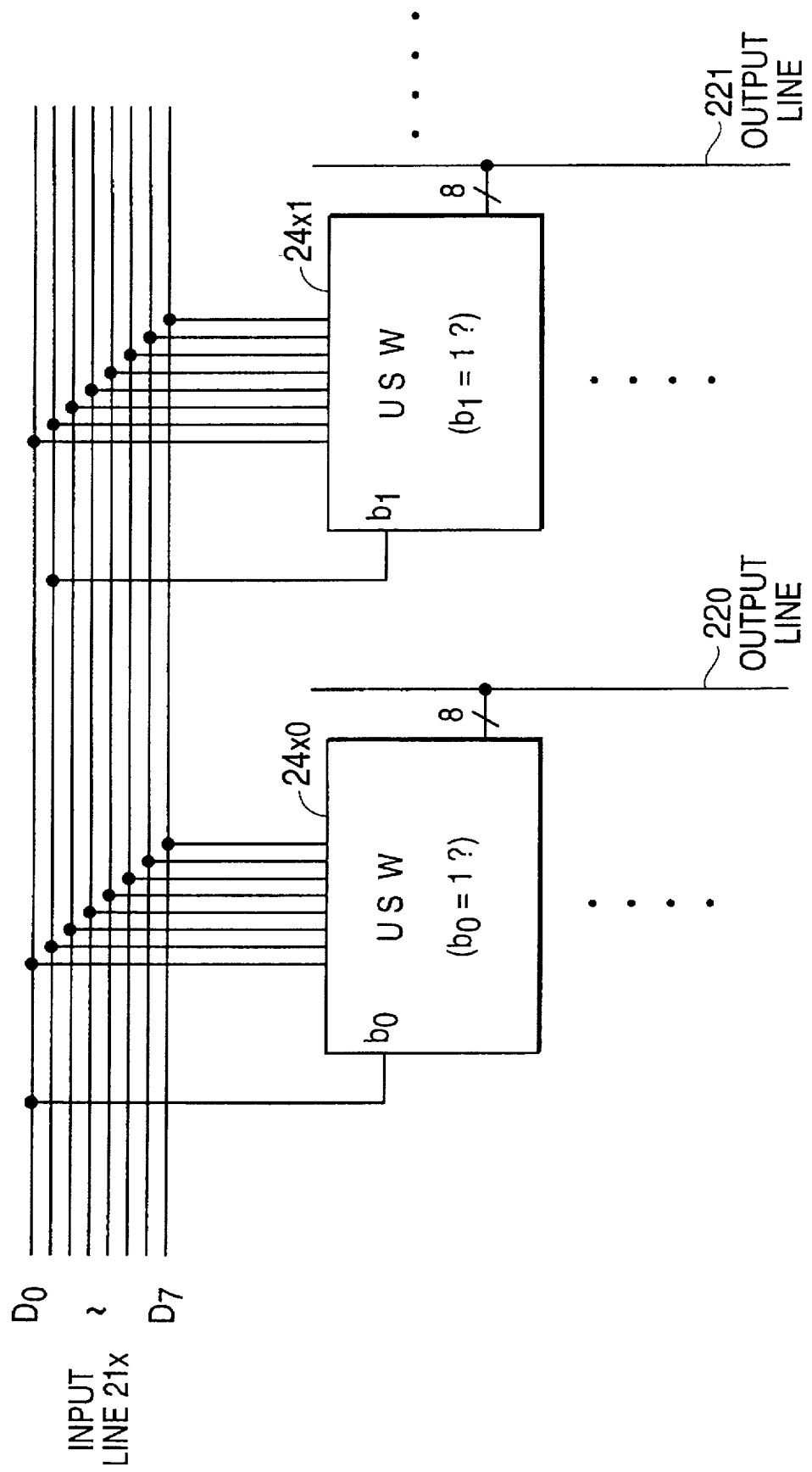

BROADCAST METHOD AND SYSTEM WITH CELL TAG INFORMATION FOR MULTIPLE SELF-ROUTING

This application is a continuation of application Ser. No. 08/243,444, filed May 16, 1994, now abandoned, which is a continuation of application Ser. No. 07/854,574, filed Mar. 20, 1992, now abandoned.

This application is cross referenced to U.S. patent application Ser. No. 08/479,865, filed Jun. 7, 1995, which is a continuation application of U.S. patent application Ser. No. 08/375,221 filed Jan. 19, 1995, now abandoned, which is a continuation application of U.S. patent application Ser. No. 07/671,526 filed Mar. 19, 1991, now abandoned.

BACKGROUND OF THE INVENTION

The present invention relates to a broadcast method for enabling a cell inputted from one input line to be transmitted to a plurality of output lines using a self-routing switch operated in an asynchronous transfer mode (ATM) in an integral broadband service digital network.

Asynchronous transfer mode (ATM) has become important in communication technologies for establishing integral broadband service digital networks which have been studied and developed by the International Telegraph and Telephone Consultative Committee (CCITT) and other organizations.

FIG. 1 shows an example of a system configuration of the broadband switching unit used in the present invention.

A plurality of subscriber terminal equipments 1 such as telephone, TV-telephone, facsimile, and computer terminals are accommodated in a broadband switching unit 2 through a subscriber line 3 and another line 4.

A subscriber terminal equipment TE 1 communicates with a central controller CC 11 in a broadband switching unit 2 through the line 4, and is assigned a virtual path identifier VPI and a virtual channel identifier VCI by the central controller CC 11. The VPI is for determining a path between a terminal terminator for terminating the plurality of subscriber terminal equipments 1 and a switching unit. The VCI is a channel assigned to each of the subscriber terminal equipments TE 1 accommodated in the terminal terminator.

The terminal equipment TE 1 generates a cell containing information to be transmitted to a destination using the assigned VPI and VCI. FIG. 2 shows a conventional cell used in the prior art technology. FIG. 2A shows a cell generated by the terminal equipment TE 1.

The terminal equipment TE 1 divides the information to be transmitted to a destination terminal equipment into pieces of 48-octet user information U. A header H is added to each of the divided pieces of information to generate a 53-octet cell. The header H comprises 4-octet VPI and VCI data, and a one-octet header error control HEC. The terminal equipment TE 1 sends the generated cell to a broadband switching unit through the subscriber line 3.

In the broadband switching unit 2, a subscriber interface SINF 5 receives a cell from the terminal equipment TE 1. After the cells are synchronized, they are transmitted to an ATM interface 6 (ATMIF).

After removing the header error corrector HEC from the 5-octet header in the cell transmitted by the subscriber interface SINF 5, the ATM interface ATMIF 6 adds a 2-octet tag information area to the header, and transmits it to a tag information adder VCC 7 (VCI controller).

The central controller CC 11 generates tag information TAG for indicating a specified destination terminal equipment in the process of communicating with the terminal equipment TE 1 through the line 4, and sends it to the tag information adder VCC 7 through a switch controller SMASH 12 (switch module access shelf).

As shown in FIG. 2B, the tag information TAG is 2-octet information comprising four sets of 4-bit ($b_0$–$b_3$) routing information S (each of the four pieces of routing information is named $S_1$–$S_4$). However, only three bits ($b_0$–$b_2$) of four bits ($b_0$–$b_3$) are significant bits. The remaining bit $b_3$ is unused.

The tag information adder VCC 7 sets in the tag information area of the cell transmitted from the ATM interface ATMIF 6 the tag information TAG transmitted from the central controller CC 11 through the switch controller SMASH 12. Then, the tag information adder VCC 7 sends the 54-octet cell to a switch SW 9 through a multiplexer/demultiplexer MDX 8.

The switch SW 9 has a configuration in which three self-routing switches SRM (Self Routing Module 20-1, 20-2, and 20-3) are serially connected.

FIG. 3 shows the configuration of self-routing switch SRM 20-N of the prior art which was used as SRMs 20-1 to 20-3. The a self-routing switch SRM 20-N comprises eight input lines 21 ($21(0)$–$21(7)$), eight output lines 22 ($22(0)$–$22(7)$) and 8×8 unit switches USW 23 ($23_{00}$–$23_{77}$).

One unit switch USW 23 is provided at eight points on each of eight input lines 21, each point corresponding to one of eight output lines 22. Each switch is assigned a conduction code.

The 54-octet cell transmitted from the tag information adder 7 is applied to the first self-routing switch SRM 20-1. For example, assume that the cell is applied to the input line $21_0$ of the first self-routing switch SRM 20-1. The eight unit switches USW $23_{00}$–$23_{07}$ connected to the input line $21_0$ extracts the first routing information $S_1$ from the tag information TAG added to the header H of the inputted cell. Then, each of the switches compares a 3-bit binary number comprising $b_0$–$b_2$ ((000), for example) with the corresponding conduction number C. If the two values match, the corresponding switch USW ($23_{00}$, for example) becomes conductive and transmits the cell inputted to the input line $21_0$ to the corresponding output line ($22_0$, for example).

The cell outputted from the output line $22_0$ of the first self-routing switch SRM 20-1 is then applied to the input line of the second self-routing switch SRM 20-2. Likewise, in the second and the third self-routing switches SRM (20-2 and 20-3), each of the unit switches USW 23 compares the three bits $b_0$–$b_2$ in the second and the third routing information $S_2$ and $S_3$ with its own conduction code C. If these values match, the corresponding unit switch USW 23 $_{XI}$ (X and I correspond to one of 0–7) transmits the inputted cell to the corresponding output line $22_I$.

The cell outputted from the output line $22_I$ of the third self-routing switch SRM 20-3 is transmitted to the multiplexer/demultiplexer MDX 10. The multiplexer/demultiplexer MDX 10 extracts the fourth piece of routing information $S_4$ from the tag information TAG added to the header H of the cell transmitted from the switch SW 9, and selects one of the eight output lines.

As described above, the tag information TAG added to an existing cell comprises 4-bit routing information $S_1$–$S_4$, and specifies using a 3-digit binary number one of the eight output lines 22 for each of the self-routing switches SRM 20 and the multiplexer/demultiplexer MDX 10. Therefore, each cell is transmitted to only one output line 22, and cannot realize a broadcast in which a cell is simultaneously transmitted to a plurality of output lines.

SUMMARY OF THE INVENTION

The present invention has been developed based on the above described background, and aims at realizing a self-routing switch for executing a broadcast.

The present invention relates to a self-routing switch which comprises a plurality of input lines and output lines, analyzes self-routing information added to a cell inputted to each of the input lines, and selects output lines for transmitting the cell according to the analysis result.

First, the routing information added to the cell comprises a set of bits corresponding to the output line, and a routing information setter is provided to set to a predetermined logical value the bit corresponding to the output line for transmitting the cell.

Next, a unit switch is provided for each input line to correspond to each of the output lines. The unit switch analyzes the routing information of the cell inputted from the input line, and transmits the cell to the corresponding output line when the bit corresponding to the unit switch is set to a predetermined logical value.

In the above configuration, the routing information setter sets a plurality of bits to a predetermined logical value so that a plurality of unit switches can simultaneously transmit the cell to the corresponding output lines, thus realizing a broadcast.

Furthermore, the routing information setter adds plural pieces of routing information to the cell so that the cell can be transmitted to a plurality of specified output lines through a plurality of serially connected self-routing switches.

In the configuration of the present invention, the self-routing switch transmits a cell inputted from one input line to a plurality of output lines, thus realizing a self-routing switch which allows a broadcast.

BRIEF DESCRIPTION OF THE DRAWINGS

Other objects and features of the present invention can be easily recognized by referring to the attached drawings and the description of the preferred embodiments of the present invention.

FIG. 6A shows a configuration of a cell of the prior art.

FIG. 6B shows a configuration of a cell of the preferred embodiment;

FIG. 7 shows a switch circuit of the preferred embodiment;

DESCRIPTION OF THE PREFERRED EMBODIMENTS

Explanation of the Principle

Figure 4:
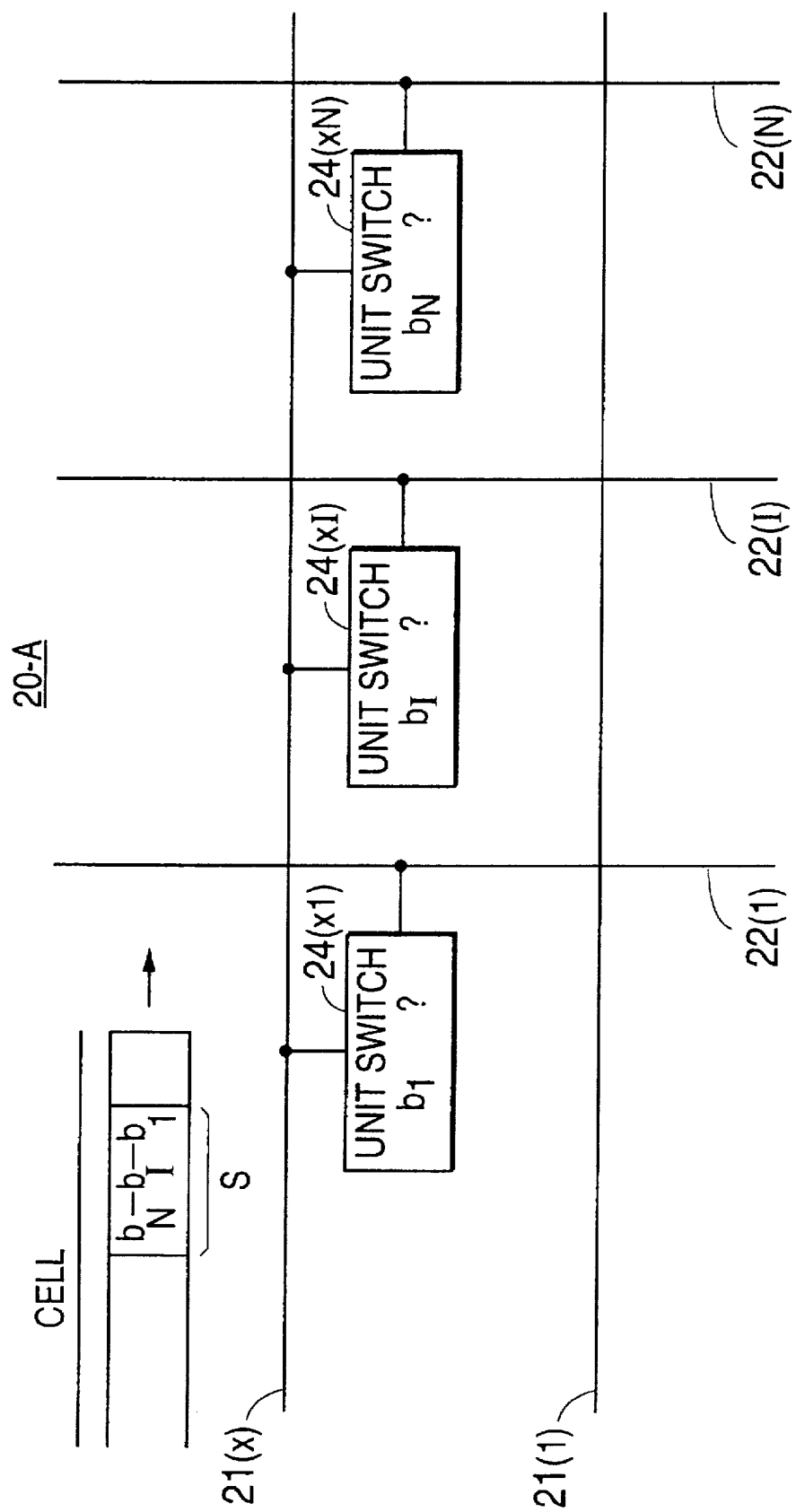
FIG. 4 shows a view for explaining the principle of the present invention.

FIG. 4 shows a view for explaining the principle of the present invention. It is a detailed illustration of a self-routing switch SRM 20-A used as SRMs 20-1 to 20-3 in the system configuration of the broadband switching unit shown in FIG. 1. The self-routing switch SRM 20-A comprises a plurality of input lines 21 ($21_{(1)}$–$21_{(x)}$); a plurality of output lines 22 ($22_{(1)}$–$22_{(N)}$); and, for each input line 21, a plurality of unit switches 24 corresponding to the plurality of output lines 22. There are X×N unit switches 24 ($24_{(11)}$–$24_{(XN)}$).

A cell is transmitted to one of the input lines 21 of the self-routing switch SRM. The cell is led by N-bit ($b_1$–$b_N$) routing information S. The routing information S is generated by the central controller CC 11 in the system configuration of the broadband switching unit shown in FIG. 1, and set in the header of the cell by the tag information adder VCC 7.

The operation according to the above principle configuration is explained below.

The central controller CC 11 adds to a cell the routing information S comprising a set of bits $b_1$–$b_N$ each corresponding to the output lines $22_{(1)}$–$22_{(N)}$, and sets the bit $b_I$ corresponding to the output line $22_{(I)}$ for transmitting the cell at a predetermined logical value.

Each of the unit switches $24_{(X1)}$–$24_{(XN)}$ analyzes the routing information S of the cell inputted from the input line $21_{(X)}$, and transmits the cell to the corresponding output line $22_{(N)}$ when the bit $b_I$ corresponding to the unit switch $24_{(XI)}$ is set to a predetermined logical value.

A plurality of bits $b_I$ contained in the added routing information S are set to a predetermined logical value so that a cell can be simultaneously transmitted to a plurality of output lines $22_{(I)}$. If plural pieces of routing information are added to a cell, the cell can be transmitted to a plurality of predetermined output lines $22_I$ through a plurality of serially connected self-routing switches SRM 20.

Therefore, a cell inputted from one input line can be transmitted to a plurality of output lines, thus realizing a self-routing switch which allows broadcast.

Description of the Preferred Embodiments

The preferred embodiments of the present invention are explained below by referring to the attached drawings.

Figure 1:
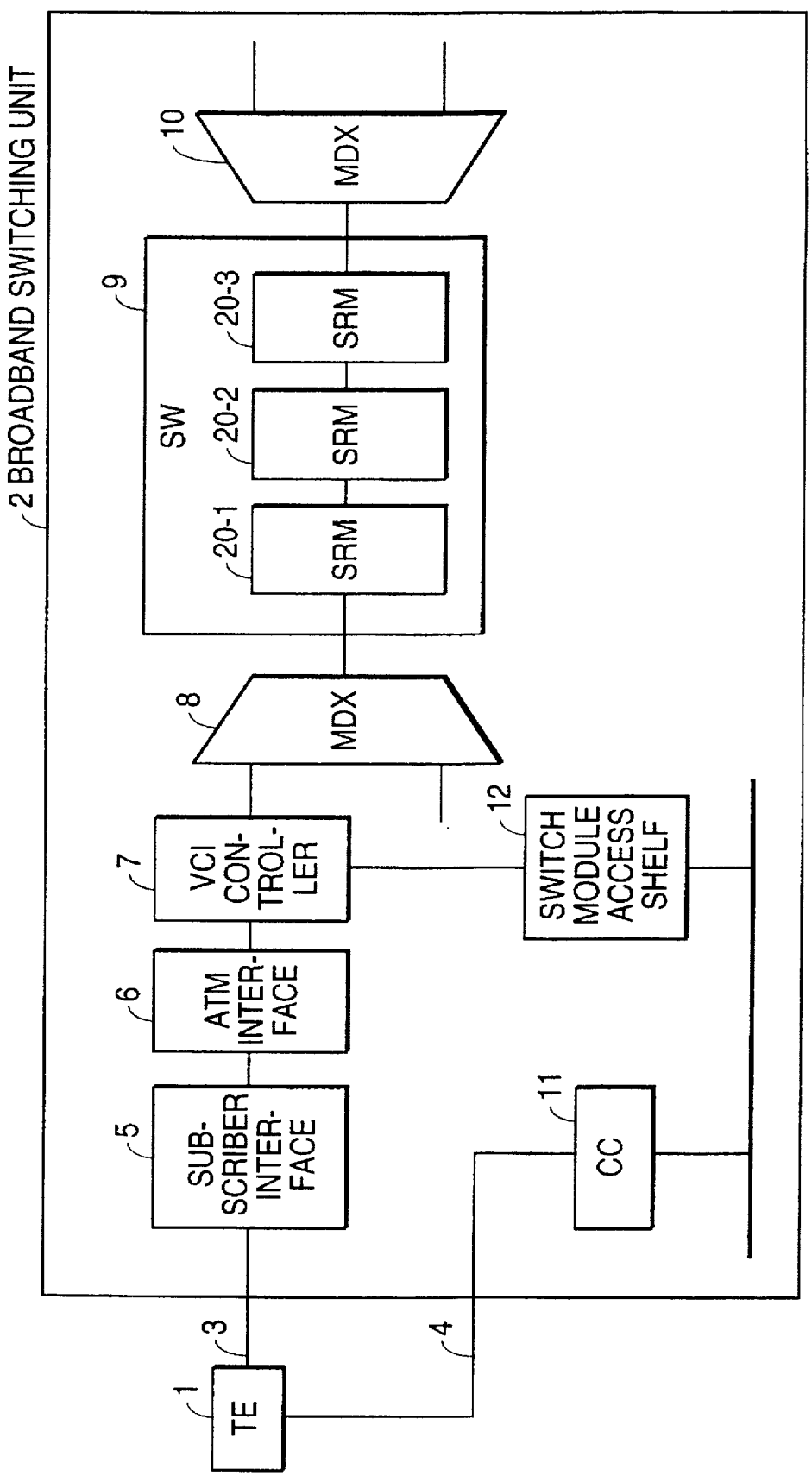
FIG. 1 shows a system configuration of the broadband switching unit related to the present invention.
Figure 2A:
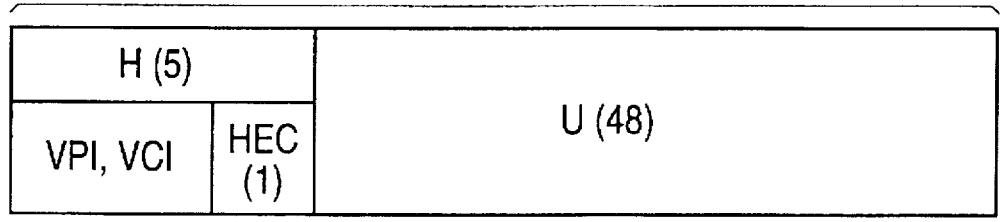
FIG. 2 shows a view for explaining the cell of the prior art technology.
Figure 2B:
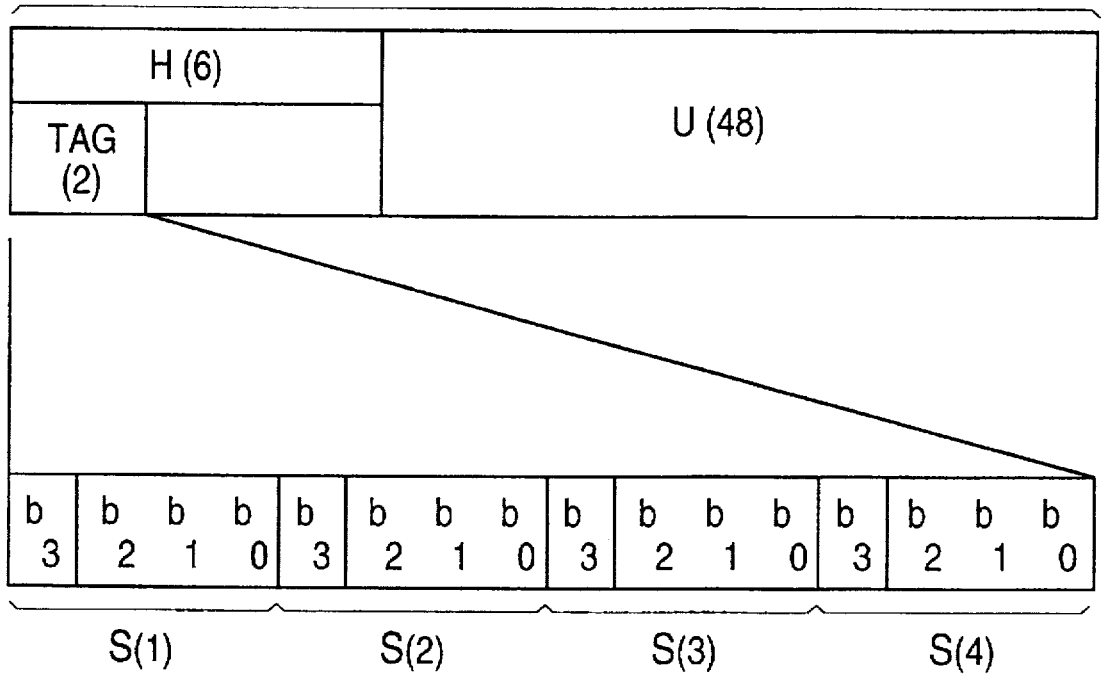
Figure 3:
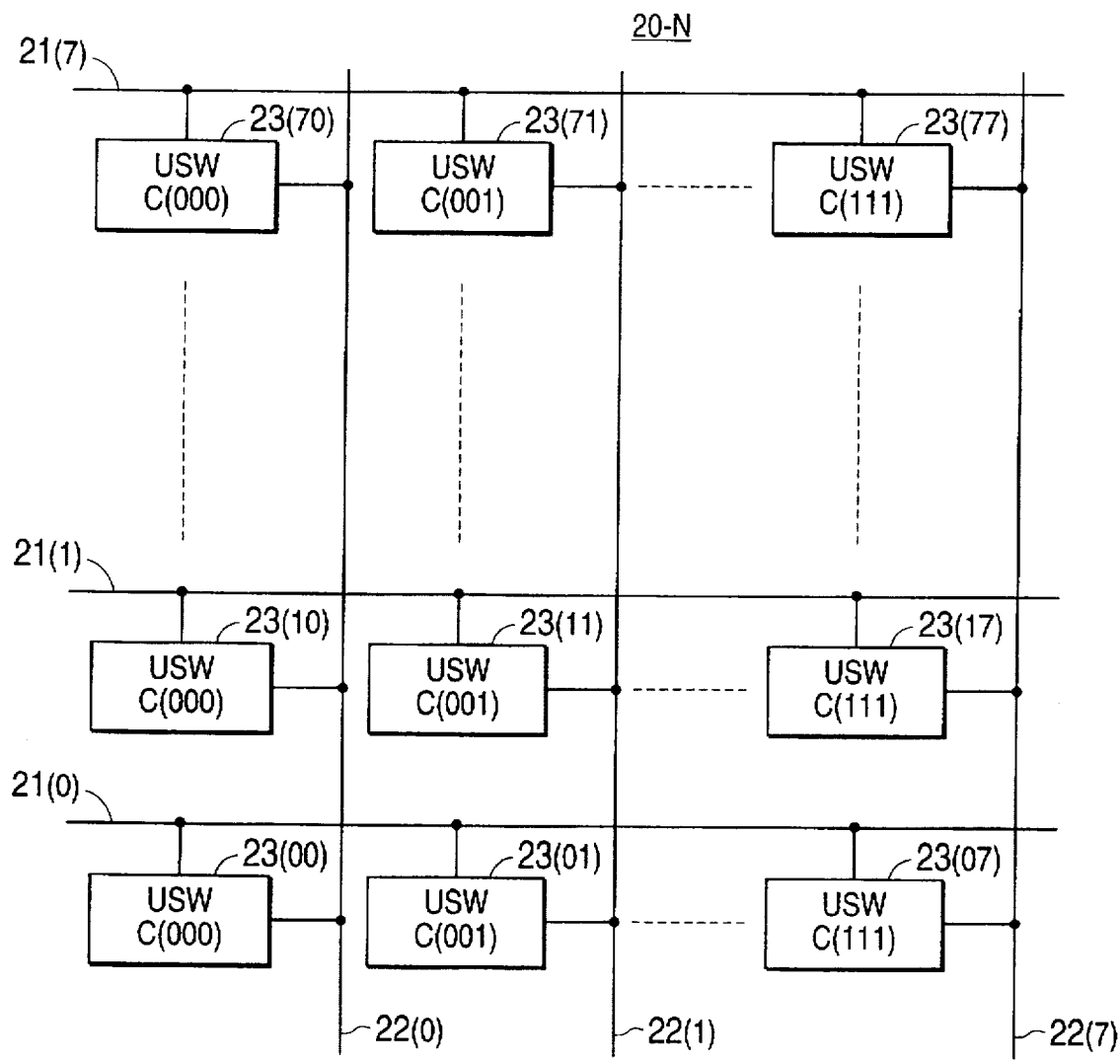
FIG. 3 shows a view of a self-routing switch of the prior art technology.
Figure 5:
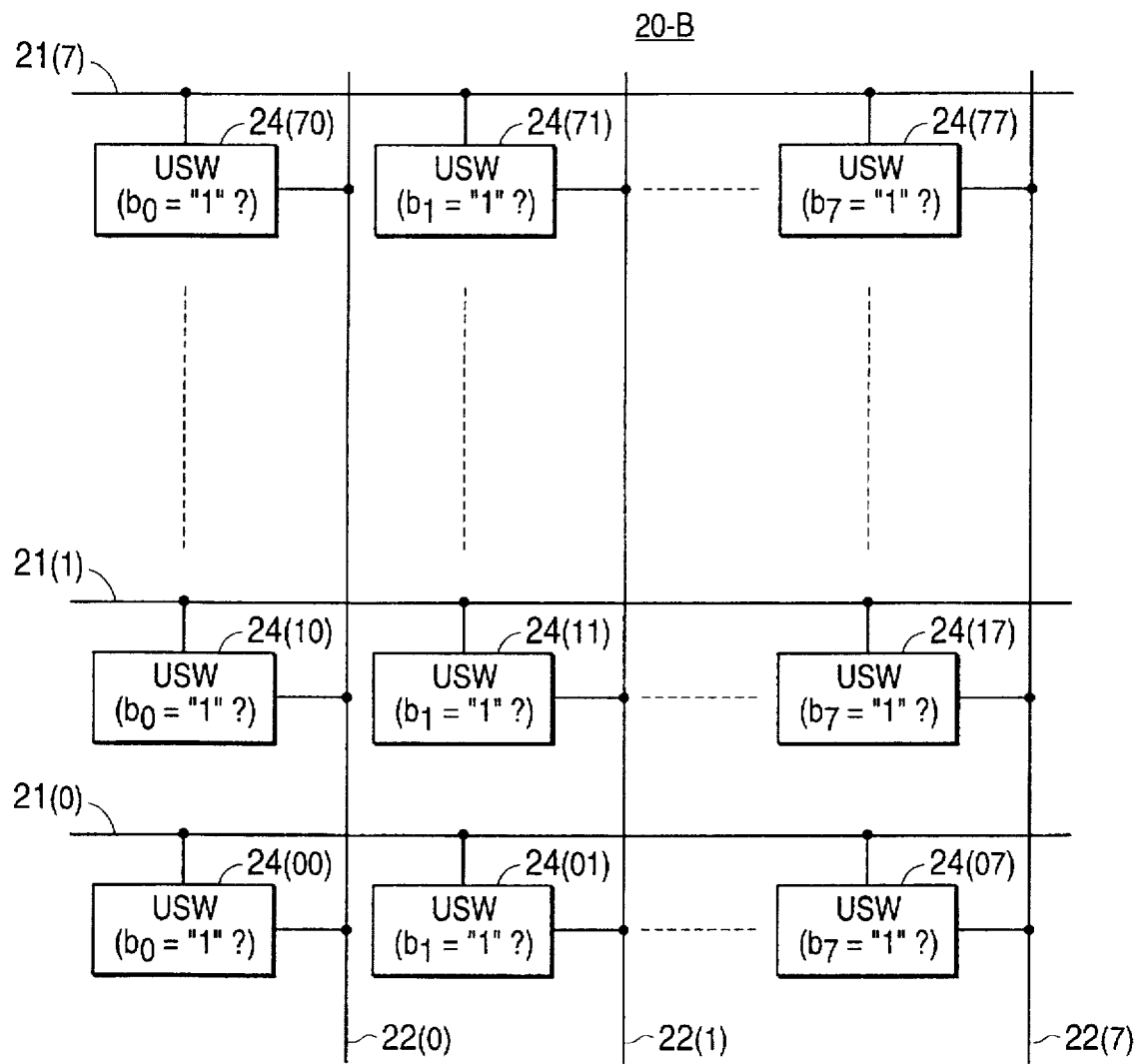
FIG. 5 shows a self-routing switch of the preferred embodiment.

FIG. 5 shows a self-routing switch SRM 20-B in an embodiment of the present invention. In all the drawings, the same numbers refer to the same objects. The broadband switching unit related to the present invention is shown in FIG. 1. FIG. 5 shows the internal configuration of one of the self-routing switches SRMs 20-1 to 20-3 in the switch SW 9 of the broadband switching unit 2 shown in FIG. 1.

The present embodiment refers to the self-routing switch SRM 20-B comprising eight input lines, eight output lines, and 64 (8×8) unit switches. Eight unit switches USW $24_{(XI)}$ (I=0, 1, . . . , 7) are connected to each of the eight input lines $21_{(X)}$ (x=0, 1, . . . , 7). Each unit switch USW $24_{(XI)}$ is connected to eight output lines $22_{(I)}$.

In FIGS. 1 and 5, the terminal equipment TE 1 notifies a request for broadcast of the central controller CC 11 in the process of communicating with the central controller CC 11 in the broadband switching unit 2 through the line 4. As in the prior art technology, the information to be transmitted to a destination terminal equipment is divided into pieces of data to be stored in a fixed length cell after being assigned a virtual path identifier VPI and a virtual channel identifier VCI.

FIG. 6A shows the configuration of prior art cell generated by the terminal equipment TE 1. The terminal equipment TE 1 divides the information to be transmitted to the destination terminal unit into plural pieces of 48-octet user information U, and adds a 5-octet header H to each piece, thus generating a 53-octet cell. One octet of the header is used as a header error controller HEC, and the other 4 octets store a VPI and a VCI. The generated cell is sent to the broadband switching unit 2 through the subscriber line 3.

In the broadband switching unit 2, the subscriber interface SINF 5 receives a cell transmitted from the terminal equipment TE 1. When cells are synchronized, the cell is transmitted to the ATM interface ATMIF 6.

The ATM interface ATMIF 6 removes the header error corrector HEC from the 5-octet header H of the cell transmitted from the subscriber interface SINF5, adds a 4-octet tag information area, and transmits the cell to the tag information adder VCC 7.

The central controller CC 11 communicates with the terminal equipment TE 1 through the line 4 as in the prior art technology, and generates tag information TAG indicating the destination terminal equipment in the broadcast communication, and transmits it to the tag information adder VCC 7 through the switch controller SMASH 12.

FIG. 6B shows the tag information TAG of the preferred embodiment. The information comprises four sets of 8-bit ($b_0$–$b_7$) routing information S ($S_1$–$S_4$).

Each of eight bits ($b_0$–$b_7$) forming each of the first to third pieces of routing information ($S_1$–$S_3$) corresponds to eight output lines ($22_0$–$22_7$) of the three self-routing switches SRM (20-1–20-3) forming the switch SW 9. The bit $b_I$ corresponding to the output line $22_I$ for transmitting a cell containing the routing information ($S_1$–$S_3$) is set to a logical value "1". All the other bits $b_J$ (J≠I) are set to a logical value "0". Therefore, in conducting broadcast communication, a plurality of bits $b_I$ are set to a logical value "1".

The tag information adder VCC 7 sets in the tag information area of the cell transmitted from the ATM interface ATMIF 6 the tag information TAG transmitted from the central controller CC 11 through the switch controller SMASH 12. Then, the 58-octet cell is transmitted to the switch SW 9 through the multiplexer/demultiplexer MDX 8.

The switch SW 9 has a configuration in which the three self-routing switches SRMs 20-1 to 20-3 are serially connected as shown in FIG. 5. As described above, each of the self-routing switches SRMs 20-1 to 20-3 comprises eight input lines 21 ($21_0$–$21_7$), eight output lines 22 ($22_0$–$22_7$), and 8×8 unit switches USW 24 ($24_{00}$–$24_{77}$). according to the present preferred embodiment. Each of the unit switches 24 is provided corresponding to eight output lines 22 for each of eight input lines 21.

Assume that the first self-routing switch SRM 20-1 applies the cell transmitted from the tag information adder VCC 7 to the input line $21_0$, for example.

The eight unit switches USW ($24_{00}$–$24_{07}$) connected to the input line $21_0$ extract the first routing information $S_1$ from the tag information TAG added to the cell header H. The unit switch USW $24_{00}$ analyzes the logical value of the corresponding bit $b_0$. The unit switch USW $24_{01}$ analyzes the logical value of the corresponding bit $b_1$. Likewise, the following unit switches USW $24_{0I}$ (I=2, 3, . . . , 7) analyze the logical value of the bit $b_I$. As a result, for example, if the unit switches USW $24_{00}$ and $24_{07}$ detect that the logical value "1" is set to the corresponding bits $b_0$ and $b_7$, and if the other unit switches USW $24_{01}$–$24_{06}$ detect that the logical value "0" is set to the corresponding bits $b_1$–$b_6$, the unit switches USW $24_{00}$ and $24_{07}$ transmit the inputted cell to the corresponding output lines $22_0$ and $22_7$.

FIG. 7 shows the connection method in the preferred embodiment, and illustrates the connection of each of the unit switches USW 24, the input lines 21, and the output lines 22.

Each of the input lines 21 ($21_0$–$21_7$) comprises a data bus of 8-bit width data. In FIG. 7, only one input line $21_X$ is actually illustrated. A 56-octet cell of 8-bit width is transmitted to the data bus. Eight unit switches USW 24 ($24_{X0}$–$24_{X7}$) corresponding to each of the output lines 22 ($22_0$–$22_7$) are connected to the input line $21_X$. FIG. 7 shows only the unit switches USW $24_{X0}$ and $24_{X1}$ corresponding to the output lines $22_0$ and $22_1$. The self-routing switch 20 associated with the unit switch USW $24_{X0}$ is the first of the three.

The unit switch USW $24_0$ determines whether or not a cell is transmitted to the output line $22_0$, and, if yes, executes a transmission process. The unit switch USW $24_{X1}$ determines whether or not a cell is transmitted to the output line $22_1$, and, if yes, executes a transmission process. The unit switch USW $24_{X0}$ is connected to an 8-bit data bus $D_0$ ($D_0$–$b_0$) of the input line $21_X$. The unit switch USW $24_{X1}$ is connected to an 8-bit data bus $D_1$ ($D_1$–$b_1$).

An 8-octet header is led by the cell inputted from the input line $21_X$, and the 4 leading octets of the header are used as a TAG for a self-routing process. If the first self-routing switch 20-1 is being used, the first 1-octet $S_1$ ($b_0$–$b_7$) is used for the self-routing process.

Each of the unit switches USW 24 ($24_{X0}$–$24_{X7}$) determines whether or not a cell is transmitted according to each of the values of the routing information $b_0$–$b_7$. If yes, it transmits a cell to the output lines $22_0$–$22_7$.

Figure 8A:
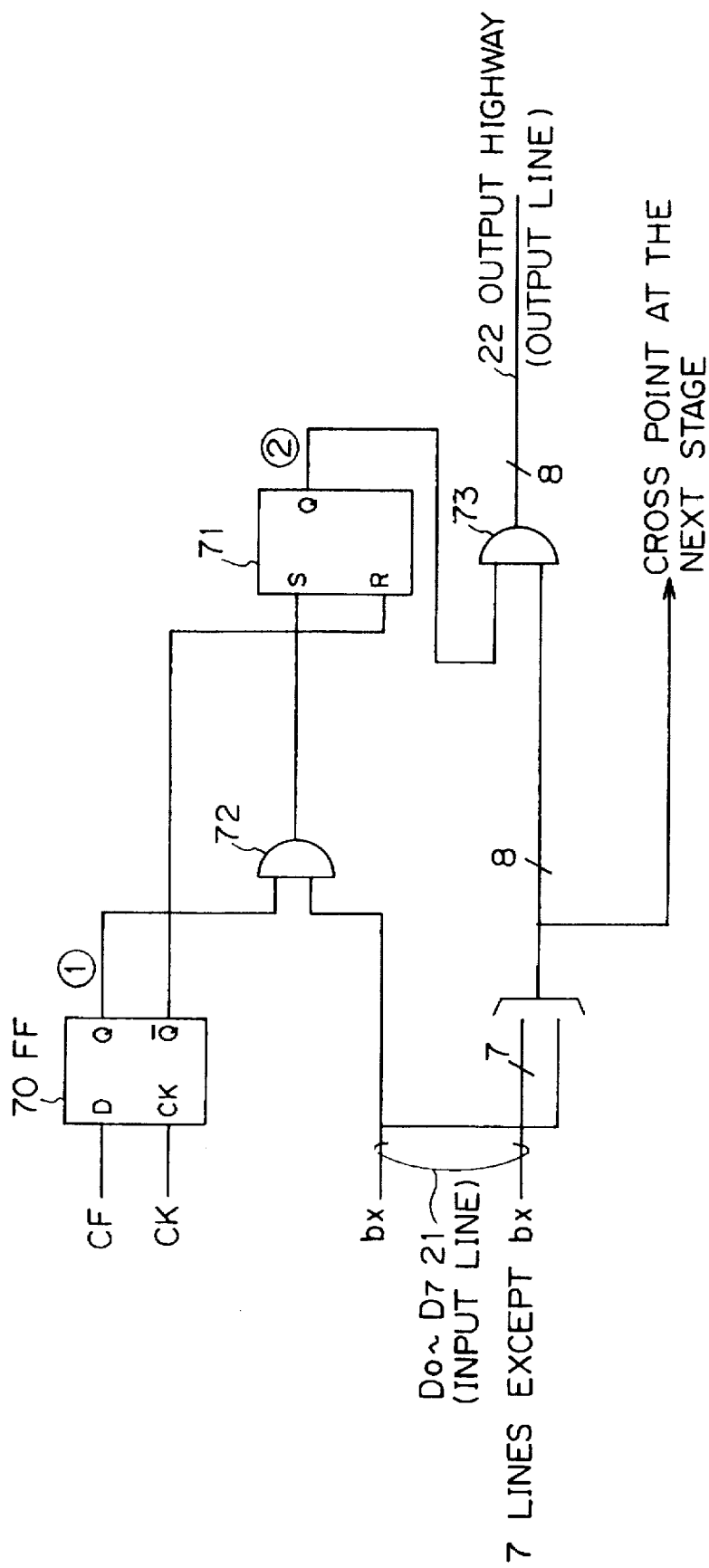
FIG. 8A is a block diagram of a unit switch USW 24.
Figure 8B:
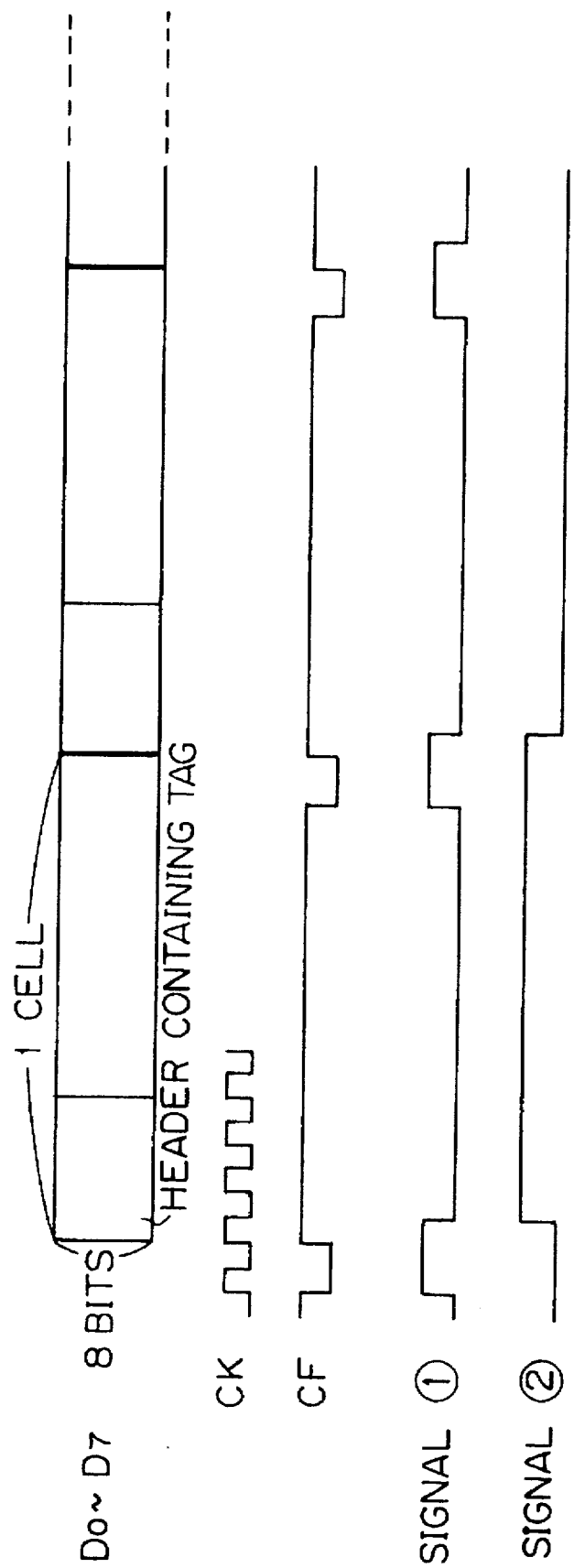
FIG. 8B is a time chart of signals in the unit switch USW 24.

FIG. 8A is a block diagram of the unit switch USW 24 of the preferred embodiment, and FIG. 8B is a time chart of signals in the unit switch USW 24.

As shown in FIG. 8A, the unit switch USW 24 comprises two RS flip-flop circuits (70 and 71) and two AND gates (72 and 73). The input line 21 shown in FIG. 7 is an 8-bit-width data bus $D_0$–$D_7$, and the output line 22 is an 8-bit-width data bus shown as an output highway.

As shown in FIGS. 8A and 8B, a cell is transmitted to the input line 21, that is, an 8-bit-width data bus. Since the input line 21 is eight bits wide, 8-bit data (comprising header information and user information) are transmitted in each cell synchronization cycle.

A cell synchronization signal CK and a cell frame pulse signal CF are applied to a flipflop circuit 70. The output Q of the flip-flop 70 can be ①, as shown in FIG. 8B. The output ① and the routing information $b_X$ inputted from the input 21 are applied to the AND gate 72. The output of the AND gate 72 indicates a positive logic pulse when the output Q of the flip-flop 70 and the logical value of $b_X$ indicate "1". By contrast, when the logical value of $b_x$ is "0", the output of the AND gate 72 remains the logical value "0".

The output of the AND gate 72 is used as a set signal S of the second flip-flop circuit 71. A reset signal R of the second flip-flop circuit 71 is a negative logical output (Q) of the first flip-flop 70. The output Q of the second flip-flop circuit 71 is indicated by a signal ② in FIG. 8B. That is, when a cell is transmitted with the logical value of $b_X$ set to "1", the output Q of the second flip-flop circuit 71 indicates the logical value "1" during the cell process.

The output Q of the second flip-flop circuit 71 is applied to the second AND gate 73. Other inputs to the second AND gate 73 are 8-bit-width cell data $D_0$–$D_7$ to be transmitted to the input line 21. The output line of the second AND gate 73 is connected to the output line $22_X$, and is used to send cell data when the signal ② indicates the logical value "1". The data $D_0$–$D_7$ of the input line 21 are transmitted to the unit switch USW $24_{X+1}$ corresponding to the next output line $22_{X+1}$.

As described above, each of the eight unit switches 24 analyzes the tag of the cell inputted to the input line 21, and a unit switch indicating the value 1 in $b_x$ transmits a cell to the output line 22.

Likewise, in the second and third self-routing switches SRMs 20-2 and 20-3, each of the unit switches USW 24 analyzes the bits $b_0$–$b_7$ corresponding to the second and third pieces of routing information $S_2$ and $S_3$. One or more unit switches USW 24 which detect the bit $b_I$ indicating the logical value "1" transmit an inputted cell to the corresponding output line $22_I$.

Since the cell applied to the switch 9 comprises 56 octets, that is, two octets more than the conventional cell, it is necessary to extend the throughput of the switch 9 by increasing a clock frequency, for example.

The preferred embodiments shown in FIGS. 5–8A and 8B are only examples. The routing information S is not limited to a setting of the bit "b" to the logical value "1" to output a cell, but the logical value can be set to "0". In any case, the effect of the present invention works sufficiently. It is obvious that the broadband switching unit related to the present invention is not limited to the one shown in FIG. 1.

What is claimed is:

1. A broadcasting method for an asynchronous transfer mode cell, comprising the steps of:

adding routing information to the asynchronous transfer mode cell, the routing information being used by switch modules to output the asynchronous transfer mode cell to output lines;

setting bits in the routing information, each of the bits corresponding to one of the output lines; and outputting the asynchronous transfer mode cell to the output lines designated by the bits of the routing information set by said setting step.

2. An asynchronous transfer mode cell broadcasting system comprising:

a plurality of switch modules, connected in series, each switch module switching an asynchronous transfer mode cell inputted from an input line connected thereto to at least one output line among N output lines, N being an integer grater than one; and a tag information adder, provided in the input line connected to a first switch module of said plurality of switch modules, for adding tag information used by at least two switch modules of said plurality of switch modules, the tag information for one of said plurality of switch modules including N bits, each of the N bits corresponding to one of the N output lines, the tag information indicating whether each of the plurality of switch modules outputs the asynchronous transfer mode cell from the input line so that the asynchronous transfer mode cell is outputted to the at least one output line among the N output lines designated by the tag information.

3. An asynchronous transfer mode cell broadcasting system, comprising:

a plurality of switch modules, connected in series, each switch module switching an asynchronous transfer mode cell inputted from an input line connected thereto to at least one output line among N output lines, N being an integer greater than one; and a tag information adder, provided in the input line connected to a first switch module of said plurality of switch modules, for adding tag information used by at least two switch modules of said plurality of switch modules, the tag information for one of said plurality of switch modules including N bits, each of the N bits corresponding to one of the N output lines, the tag information indicating whether each of the plurality of switch modules outputs the asynchronous transfer mode cell from the input line so that the asynchronous transfer mode cell is outputted to the at least one output line among the N output lines designated by the tag information, each of said switch modules being turned ON or OFF by referencing the tag information.

4. An asynchronous transfer mode cell broadcasting method comprising the steps of:

a) exchanging an asynchronous transfer mode cell inputted from an input line connected to at least one output line among N output lines in a plurality of switch modules, N being an integer greater than one;

b) adding tag information used by at least two switch modules of the plurality of switch modules, the tag information for one of the plurality of switch modules includes N bits, each of the N bits corresponding to one of the N output lines; and c) indicating, by the tag information, whether each of the plurality of switch modules outputs the asynchronous transfer mode cell from the input line so that the asynchronous transfer mode cell is outputted to the at least one output line among the N output lines designated by the tag information.

5. A broadcast method according to claim 4 further comprising the step of:

d) simultaneously transmitting the asynchronous transfer mode cell to the at least one output line among the N output lines by setting the N bits contained in the tag information to a predetermined logical value in order to realize a broadcast.

6. A broadcast method according to claim 5 further comprising the step of:

e) transmitting the asynchronous transfer mode cell to the at least one output line among the N output lines through a plurality of serially-connected self-routing switches by adding plural pieces of routing information to the asynchronous transfer mode cell.

7. An asynchronous transfer mode cell broadcasting method comprising the steps of:

a) exchanging an asynchronous transfer mode cell inputted from an input line connected to at least one output line among N output lines in a plurality of switch modules, N being an integer greater than one;

b) adding tag information used by at least two switch modules of the plurality of switch modules, the tag information for one of the plurality of switch modules includes N bits, each of the N bits corresponding to one of the N output lines;

c) indicating, by the tag information, whether each of the plurality of switch modules outputs the asynchronous transfer mode cell from the input line so that the asynchronous transfer mode cell is outputted to the at least one output line among the N output lines designated by the tag information, each of the switch modules being turned ON or OFF by referencing the tag information.

8. A broadcasting system having output lines for an asynchronous transfer mode cell inputted into the broadcasting system, the broadcasting system comprising:

switch modules to switch the asynchronous transfer mode cell to the output lines; and a routing information adder to add routing information to the asynchronous transfer mode cell, the routing information including bits, each of the bits corresponding to one of the output lines, said routing information adder sets the bits so that the switch modules output the asynchronous transfer mode cell to the output lines designated by the routing information.

* * * * *

UNITED STATES PATENT AND TRADEMARK OFFICE
CERTIFICATE OF CORRECTION

PATENT NO. : 5,636,222  Page 1 of 2
DATED : June 3, 1997
INVENTOR(S) : Shiro URIU, et al.

It is certified that error appears in the above-indentified patent and that said Letters Patent is hereby corrected as shown below:

TITLE PAGE [56] REFERENCES CITED

Please add the following references.

U.S. Patent 5,050,164 - 9/17/91 to Chao et al.
U.S. Patent 5,062,106 - 10/29/91 to Yamazaki et al.
U.S. Patent 5,084,867 - 01/28/92 to Tachibana et al.
U.S. Patent 5,113,392 - 05/12/92 to Takiyasu et al.
U.S. Patent 5,157,654 - 10/20/92 to Cisneros
U.S. Patent 5,181,200 - 01/19/93 to Harrison
U.S. Patent 5,191,577 - 03/02/93 to Uchida et al.
U.S. Patent 5,214,651 - 05/25/93 to Baydar et al.
U.S. Patent 5,235,595 - 08/10/93 to O'Dowd
U.S. Patent 3,824,597 - 07/16/74 to Berg
U.S. Patent 4,947,388 - 08/07/90 to Kuwahara et al.
U.S. Patent 4,993,018 - 02/12/91 to Hajikano et al.
U.S. Patent 5,020,054 - 05/28/91 to May, Jr.
U.S. Patent 5,038,343 - 08/06/91 to Lebizay et al.

FOREIGN PATENT DOCUMENTS 0 339 735 A1 - 11/02/89 - Europe

UNITED STATES PATENT AND TRADEMARK OFFICE
CERTIFICATE OF CORRECTION

PATENT NO. : 5,636,222
DATED : June 3, 1997
INVENTOR(S) : Shiro URIU, et al.

It is certified that error appears in the above-indentified patent and that said Letters Patent is hereby corrected as shown below:

OTHER REFERENCES

"Communications for the Information Age", IEEE Global Telecommunications Conference and Exhibition, A Dynamically Controllable ATM Transport Network Based on the Virtual Path Concept, by Satoru OHTA, et al., pps. 1272-1276 1988 IEEE.

Signed and Sealed this

Thirtieth Day of September, 1997

*Attest:*

BRUCE LEHMAN

*Attesting Officer*     Commissioner of Patents and Trademarks